United States Patent [19]

Trevarrow

[11] Patent Number: 4,561,815

[45] Date of Patent: Dec. 31, 1985

[54] MACHINE TOOL ADJUSTMENT
[75] Inventor: David J. Trevarrow, Horton, Mich.
[73] Assignee: Schrader Machine & Tool, Inc., Hanover, Mich.
[21] Appl. No.: 603,720
[22] Filed: Apr. 25, 1984
[51] Int. Cl.⁴ .......................... B23C 1/00; B23Q 1/08
[52] U.S. Cl. .................................................. 409/227
[58] Field of Search .............. 409/206, 227, 231, 232, 409/238, 241; 82/28 R

[56] References Cited
U.S. PATENT DOCUMENTS

| 2,200,628 | 5/1940 | Lofstedt | 409/227 X |
| 2,327,598 | 8/1943 | Feigel | 409/227 X |
| 3,783,783 | 5/1965 | Huller | 409/227 |

FOREIGN PATENT DOCUMENTS 962611  7/1964  United Kingdom ................ 409/206

Primary Examiner—Eugene F. Desmond
Attorney, Agent, or Firm—Beaman & Beaman

[57] ABSTRACT

The invention pertains to an adjustment for machine tool components, such as a head or slide, wherein minute dimensional variations are achieved by the utilization of a wedge acting against a spring biasing force. The wedge is longitudinally displaced by incremental motor means and the biasing force opposing the wedge actuated forces are produced by compression spring elements.

6 Claims, 6 Drawing Figures

MACHINE TOOL ADJUSTMENT

BACKGROUND OF THE INVENTION

Machine tool components such as heads, carriages, tail stocks, tool slides and the like are mounted upon guides and ways for major adjustment, and minor adjustment is often accomplished by threaded screws and elements, shims and the like. It is often desirable to make minor adjustments in slides, work holders, tool holders, etc. to compensate for misalignment, tool wear, out-of-round relationships, and the like, and by the use of threaded fasteners, set screws, shims, etc., minute dimensional adjustments of the nature of tenths of hundredths of a thousandth of an inch are difficult to uniformly achieve. Such small dimensional adjustments are time consuming, haphazardly achieved by trial and error, and require high skills on the part of the machine tool operator.

An object of the invention is to provide an incremental fine adjustment for machine tool components wherein very accurate adjustments may be quickly achieved.

A further object of the invention is to provide a fine adjustment for machine tool components wherein the rigidity of the components is not affected by the adjustment means, and wherein only small forces are necessary to achieve the adjustment.

Another object of the invention is to provide a machine tool component adjustment utilizing wedge surfaces wherein minimum frictional resistance exists at the wedge surfaces minimizing power requirements for adjustment.

An additional object of the invention is to provide adjustment means for machine tools wherein adjustment may be readily and quickly made of minute character and yet rigidity is maintained preventing chattering and vibration during machining.

In the practice of the invention a machine tool component such as a head, spindle, carriage, slide, or the like is mounted upon a frame, usually upon conventional ways and guides. The component to be adjusted in accord with the practice of the invention includes wedge surfaces in engagement with a wedge longitudinally adjusted by an incremental motor. Adjustment of the wedge imposes a force upon the machine tool component to produce the desired adjustment.

Anti-friction bearing means are interposed between the adjustable wedge and the machine tool component and frame to minimize the energy required to move the wedge. The wedge is preferably adjusted by means of an electric indexable inching motor rotating a threaded shaft, and operation of the motor can be easily controlled to produce movements of one ten thousandths of an inch, or less.

The force imposed upon the adjusted component is resisted by high pressure compression biasing means capable of accommodating the movement produced by the wedge, yet sufficient to produce a biasing force high enough to prevent chatter and vibration even under heavy machining conditions. In the disclosed embodiment this biasing means is in the form of a plurality of Belleville or tapered disc springs under adjustable compression.

By operation of the electric inching motor, the wedge is longitudinally positioned to vary the spacing between the adjusted head, slide, carriage, etc., and the frame, and the biasing means will maintain the wedge under a predetermined compressive force eliminating any "play" or clearance assuring accurate, vibration-free adjustment. No special skills are required by the operator in that the degree of adjustment achieved may be readily observed by means of conventional gauges, and by reversing the direction of the inching motor the machine tool component may be very quickly and very accurately positioned in either direction to compensate for tool wear or other slight dimensional changes as required.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

In the following description and attached claims, it is to be understood that the adjustment means described can be used with various components of a machine tool, and the term "slide" may include a head, carriage, tool slide, tool compound, tail stock, tool support, and similar components found on machine tools commonly mounted upon the machine tool frame and usually adjustable thereto and positionable thereon.

Figure 1:
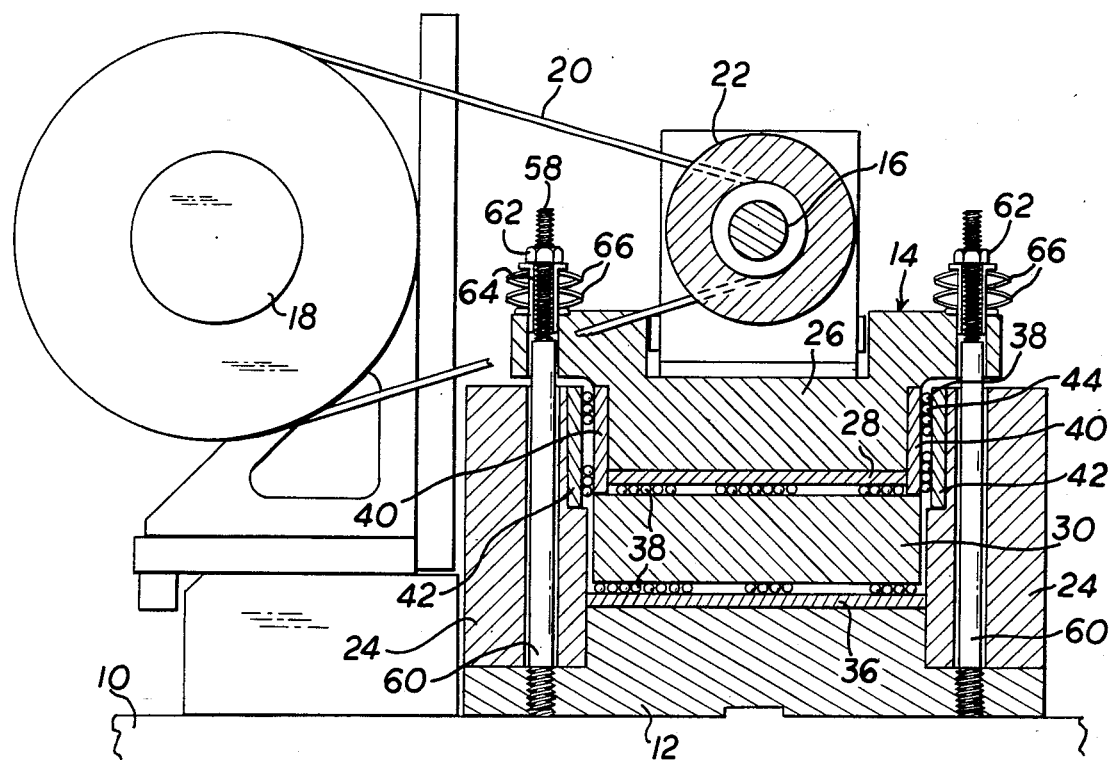
FIG. 1 is an elevational, sectional view as taken through a machine tool head structure along Section I—I of FIG. 2.
Figure 2:
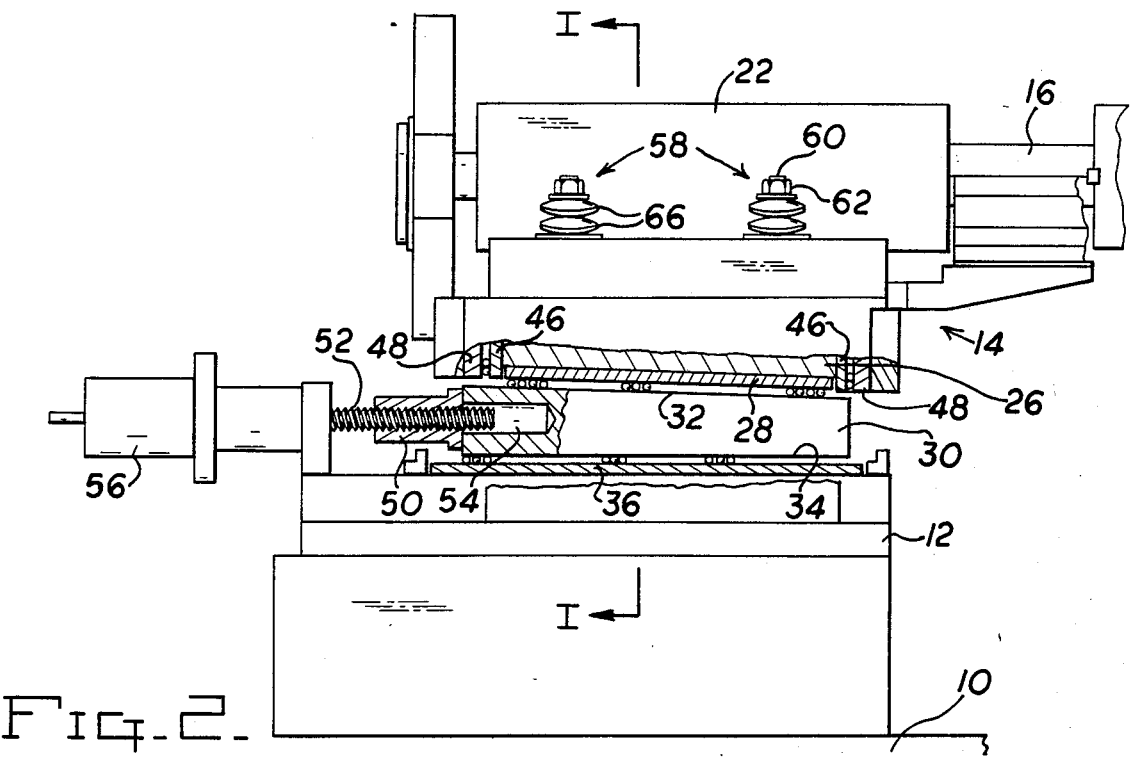
FIG. 2 is a side, elevational view, partially sectioned, of the machine tool head structure of FIG. 1.
Figure 3:
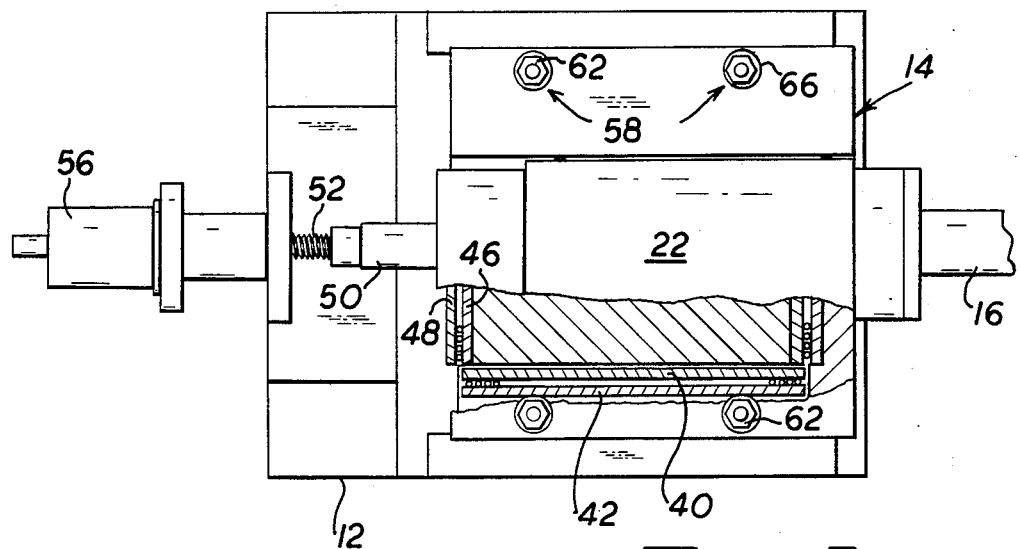
FIG. 3 is a top plan view, partially sectioned, of the machine tool head shown in FIGS. 1 and 2.
Figure 4:
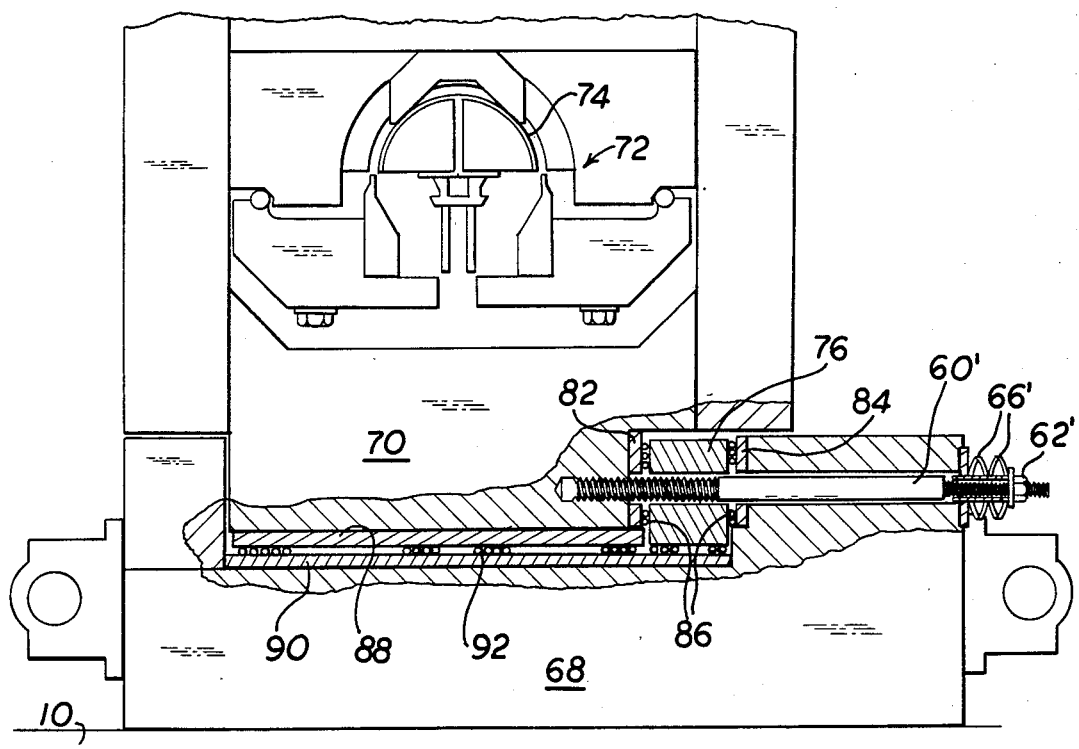
FIG. 4 is a front, elevational, partially sectioned view, of a machine tool working holding slide utilizing the adjustment apparatus of the invention.
Figure 5:
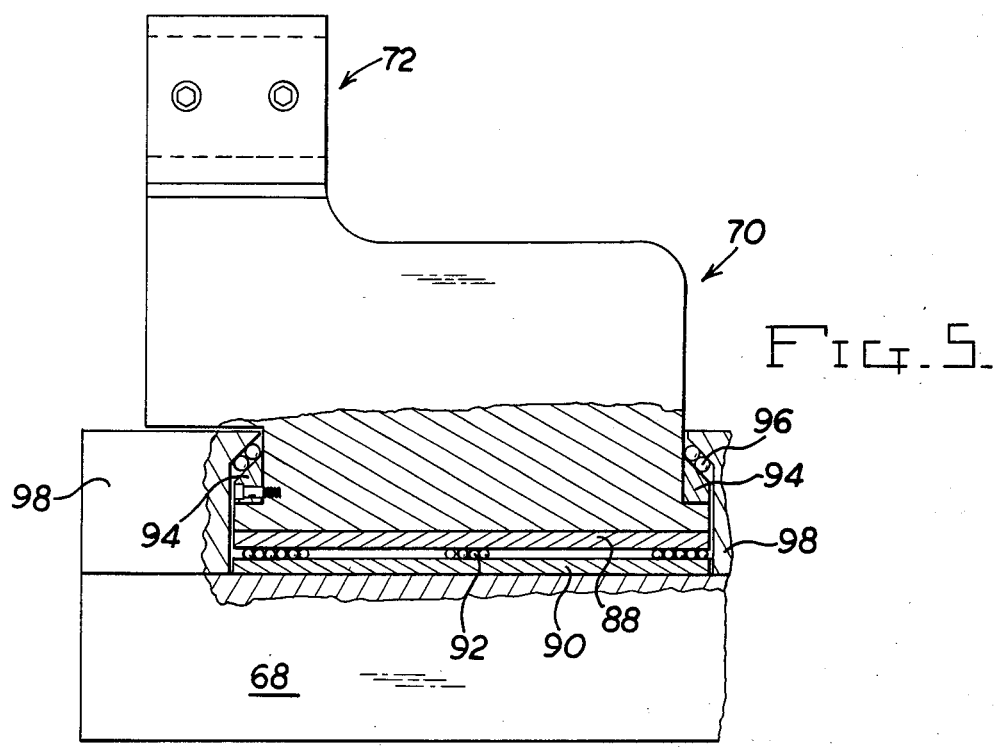
FIG. 5 is a side, elevational view, partially sectioned, of the slide of FIG. 4.
Figure 6:
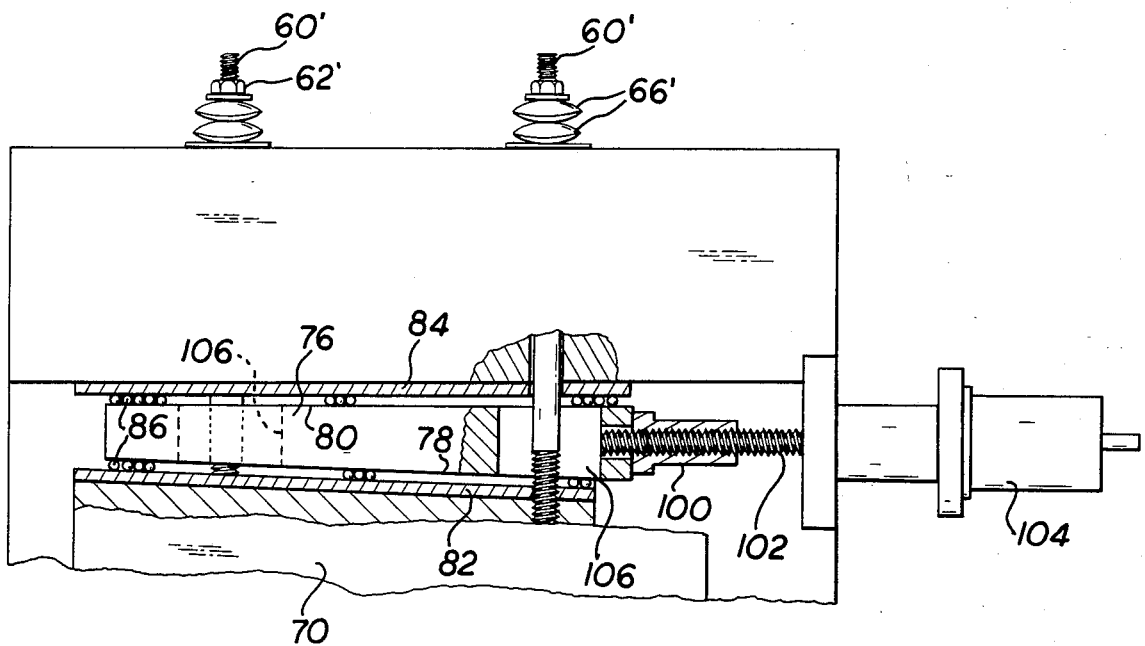
FIG. 6 is a top, detail, partially sectioned view of the slide of FIGS. 4 and 5.

In the drawings, FIGS. 1–3 illustrate the utilization of the inventive concept with a head slide for a machine tool, while FIGS. 4–6 utilize the inventive concepts with a work holding slide. In actual practice, the head slide of FIGS. 1–3 is preferably used in conjunction with the work holding slide of FIGS. 4–6 wherein relative adjustment between a boring tool and the work holder is made in the vertical and horizontal directions to produce fine incremental adjustments in both planes.

In the drawings the machine tool frame is represented at 10, and consists of a heavy base, usually cast metal, upon which various components, such as heads, slides, compounds, tool stocks, transfer apparatus, and the like, may be mounted. In the disclosed embodiment of the invention, the head block 12 is rigidly affixed to the frame and supports a head slide generally indicated at 14. A rotating boring head spindle 16 is mounted upon the head slide 14 and by means of an electric motor 18 and a belt 20, the rotatable tool spindle 16 is rotated within bearings mounted within spindle housing 22 to rotate a boring tool mounted at the right end of the spindle, not shown.

The head block 12 supports a pair of lateral guide blocks 24 rigidly affixed thereto, and the head slide 14 is located between the guide blocks. The head slide 14 includes an upper portion 26 upon which the spindle housing 22 is affixed, and the lower surface of the portion 26 is defined by a wear plate 28 attached to the underside of the portion, and oblique to the horizontal in a longitudinal direction. The wear plate 28 is formed of a hardened steel and is adjacent to the elongated wedge 30 having an oblique upper surface 32 and a horizontal lower surface 34. The block 12 is provided with an upper surface defined by the upper surface of the wear plate 36 which is in a parallel relationship to the wedge lower surface 34. A plurality of anti-friction balls 38 confined within retainers are interposed between the wear plate 28 and surface 32 and the surface 34 and wear plate 36 wherein the wedge is capable of low resistance displacement relative to the block 12 and the slide portion 26.

As apparent in FIG. 1, ball bearings 38 are interposed between lateral wear plates 40 attached to the spindle slide portion 26 and the lateral wear plates 42 attached to the guide blocks 24 permitting limited adjustment of the portion 26 in a direction parallel to the spindle 16 and such adjustment is accomplished by conventional screw members, not shown.

In an equivalent manner, anti-friction bearings 44 are located at the "ends", FIG. 3, of the slide portion 26 in engagement with the end slide wear plates 46 and the guide plate wear plates 48 permitting limited lateral adjustment of the head spindle by means of threaded adjustment of a conventional manner, not shown.

An annular elongated nut 50 is attached to the end of the wedge 30, FIG. 2, and receives the threaded rod 52. The wedge is bored at 54 to accommodate the extension of the threaded rod 52, and the outer end of the threaded rod is drivingly connected to an electric inching stepper motor 56. The motor 56 is of the stepper type, such as manufactured by Compumotor Corporation, Petaluma, Calif., Model M83-93, wherein energization of this reversible motor will index the threaded rod 52 only a degree or so to produce minute incremental longitudinal adjustment of the wedge 30. As the angular deviation of the wedge surfaces 32 and 34 from parallel is small, longitudinal adjustment of the wedge produces only a small vertical adjustment of the spindle slide portion 26 in a vertical direction, and it will therefore be appreciated that the boring spindle 16 may be raised or lowered only a fraction of a thousandth of an inch by slight rotation of the threaded rod by the stepping motor 56.

The spindle slide portion 26 is biased downwardly toward the wedge 30 by four biasing actuators 58, each consisting of a shaft 60 extending through guide blocks 24 and threaded into the block 12, FIG. 1. At the upper regions, the shafts 60 are threaded for receiving a nut 62 and flanged sleeve 64 which extends through a plurality of Belleville springs 66 which engage the spindle slide portion 26. Thus, by tightening the nut 62 to compress the disc springs 66 a very high compressive biasing force in a downward direction is imposed upon the spindle slide 26 by the Belleville springs. As will be appreciated from FIG. 3, two of the biasing actuators 58 are mounted upon each side of the spindle housing 22.

From the foregoing, it will be appreciated that the wedge 30 permits vertical adjustment of the boring spindle 16, and the high compressive force imposed upon the wedge by the springs 66 prevents chattering and vibration during machine operation, yet the very high vertically directed forces produced by the wedge 30 and stepping motor 56 are capable of compressing the Belleville springs the extent necessary to provide the desired adjustment. Of course, it is to be appreciated that the wedge 30 is used only to achieve small adjustments of only several thousandths of an inch, or fractions thereof, and resetting of the nuts 50 to vary the compression on the springs 66 is not required during operation.

FIGS. 4–6 disclose the inventive concept as applied to a machine tool work holder slide, preferably a slide used to hold work being machined by the boring spindle mounted as described in FIGS. 1–3.

The work holder slide is mounted upon the machine tool upon a block 68, and the work holder slide is generally indicated at 70. The work holder slide 70 includes work holding apparatus generally indicated at 72, FIG. 4, and in the disclosed embodiment a semi-cylindrical bearing segment 74 is chucked within the work holder for internal machining by the tool mounted upon the boring spindle 16. The apparatus 72 and mode of operation of the work holding apparatus is of no significance with respect to the inventive concepts.

The work holder slide 70 is adjustably mounted upon the block 68 for adjustment in a lateral direction as viewed in FIG. 4, and is also capable of longitudinal adjustment to the right or left as viewed in FIGS. 5 and 6.

Lateral adjustment of the work holding slide is by means of a wedge 76 having an obliquely oriented surface 78 and a base surface 80, the surface 78 being in opposed relationship to a wear plate 82 affixed to the work holding slide 70, and the surface 80 being in opposed relationship to the work holding slide 70, and the surface 80 being in opposed relationship to the wear plate 84 attached to the block 68. Anti-friction balls 86 within retainers are interposed between the wedge surfaces and the adjacent wear plates.

Likewise, as apparent from FIGS. 4 and 5, the slide bottom wear plate 88 is in opposed relationship to the block wear plate 90 and anti-friction bearings 92 are interposed therebetween for supporting the weight of the work holder slide.

Lateral adjustment of the work holding slide is accurately controlled by means of the dovetail inserts 94, FIG. 5, bolted to the slide 70 and anti-friction bearings 96 interposed between the dovetail inserts and the oblique surfaces defined on blocks 98 attached to the block 68 hold the work holder slide down and assure accuracy.

The biasing force imposed on the work holder slide 70 toward the wedge 76 is achieved by biasing actuators, identical to those described above and primed reference numerals are used to designate similar components, the actuators, consisting of rod 52' threaded at one end into the slide 70, FIG. 4, and threaded at the outer end to receive the nut 62' and the sleeve 64'. Belleville springs 66' are compressed by the nut 62' and bear against the block 68 biasing the slide 70 toward the right, FIG. 4, against the wedge 76, and in this manner the work holder slide is held in a vibration free manner.

A threaded nut 100 is attached to the end of the wedge 76, FIG. 6, for cooperation with the threaded shaft 102 rotated by the electric reversible stepping motor 104 which is identical to motor 56. Energization of the motor 104 rotates the shaft 102 to longitudinally displace the wedge to achieve the desired adjustment of the work piece spindle in a lateral horizontal direction.

The biasing actuator shafts 60' extend through the wedge 76, and in this regard the wedge is provided with elongated clearance slots 106, FIG. 6, of sufficient dimension to accommodate the shafts and permit adjustment of the wedge.

It will be appreciated that the adjustment of the work holder slide 70 permits very accurate incremental positioning of the work piece, and by means of the boring tool spindle adjustment and the work holder slide adjustment, the relative position of the tool and workpiece may be very accurately and quickly varied to maintain the required tolerances on the workpiece.

Modifications to the inventive concepts may be apparent to those skilled in the art without departing from the spirit and scope of the invention.

I claim:

1. An adjustable slide for a machine tool wherein the machine tool includes a frame, and a slide movably mounted upon the frame, the improvement comprising, in combination, a first wedge surface defined on the frame, a second wedge surface defined on the slide in opposed spaced relationship to said first wedge surface, a wedge having an axis interposed between said wedge surfaces, said wedge including a first reaction surface in opposed relation to said first wedge surface and a second reaction surface in opposed relation to said second wedge surface, at least one of said reaction surfaces and its opposed wedge surface being obliquely related to said wedge axis, anti-friction bearings interposed between said opposed wedge and reaction surfaces, a threaded shaft parallel to said wedge axis received within a threaded bore defined upon said wedge, an actuator operatively connected to said threaded shaft for rotating said shaft and adjustably positioning said wedge between said wedge surfaces to adjust the spacing between the slide and the frame, tension rods interposed between the slide and frame, and compression springs mounted upon said tension rods biasing the slide in the direction tending to decrease the spacing between said wedge surfaces.

2. In an adjustable slide for a machine tool as in claim 1, said anti-friction bearings comprising a plurality of balls.

3. In an adjustable slide for a machine tool as in claim 1, said actuator comprising an electric stepping motor.

4. In an adjustable slide for a machine tool as in claim 1, said springs comprising Belleville springs.

5. In an adjustable slide for a machine tool as in claim 1, said tension rods comprising at least one threaded rod fixed relative to the frame extending through an opening defined in the slide in a direction substantially perpendicular to the axis and general plane of said wedge, a nut threaded upon said rod spaced from said slide, said compression springs interposed between said nut and the slide.

6. In an adjustable slide for a machine tool as in claim 5, said springs comprising a plurality of Belleville springs.

* * * * *